United States Patent [19]

Spencer

[11] Patent Number: 5,409,606
[45] Date of Patent: Apr. 25, 1995

[54] FILTER APPARATUS

[75] Inventor: Terrel Spencer, Lake Geneva, Wis.

[73] Assignee: Sta-Rite Industries, Inc., Delavan, Wis.

[21] Appl. No.: 56,762

[22] Filed: May 4, 1993

[51] Int. Cl.⁶ .......................................... B01D 27/06
[52] U.S. Cl. ..................... 210/232; 210/315; 210/331; 210/347; 210/437; 210/486; 210/493.1; 210/493.5
[58] Field of Search ............... 210/232, 331, 347, 486, 210/437, 445, 453, 497.08, 497.01, 493.1, 493.5, 314, 315

[56] References Cited

U.S. PATENT DOCUMENTS

| | | | |
|---|---|---|---|
| Re. 29,447 | 10/1977 | Farrow et al. | 210/232 |
| 148,288 | 3/1874 | Edgar | 210/497.01 |
| 206,938 | 8/1878 | Emory | 210/489 |
| 828,715 | 8/1906 | Cook | 210/497.01 |
| 907,328 | 12/1908 | Freeman | 210/496 |
| 1,284,615 | 11/1918 | Davey | 210/497.2 |
| 1,333,719 | 3/1920 | Jorgenson | 210/497.2 |
| 2,104,473 | 1/1938 | Watson | 210/486 |
| 2,517,704 | 8/1950 | Overbike | 210/169 |
| 2,522,904 | 9/1950 | Slepicka | 210/183 |
| 2,883,056 | 4/1956 | Muller | 210/336 |
| 2,890,796 | 3/1957 | Blood | 210/470 |
| 3,084,427 | 4/1963 | Holcomb | 29/419 |
| 3,353,457 | 11/1967 | Whittingham et al. | 93/1.1 |
| 3,491,886 | 1/1970 | Glos, II et al. | 210/486 |
| 3,643,803 | 2/1972 | Glos, II | 210/232 |
| 3,647,083 | 3/1972 | Niccum et al. | 210/437 |
| 3,684,096 | 8/1972 | Kretchman | 210/356 |
| 3,698,562 | 10/1972 | Farrow et al. | 210/488 |
| 3,964,194 | 12/1950 | Oliver, Jr. et al. | 210/486 |
| 3,988,244 | 10/1976 | Brooks | 210/317 |
| 4,317,727 | 3/1982 | Meissner | 210/315 |
| 4,438,057 | 3/1984 | Sundseth | 210/493.1 |
| 4,507,200 | 3/1985 | Meissner | 210/315 |
| 4,537,681 | 8/1985 | Argiropoulos et al. | 210/317 |
| 4,637,873 | 1/1987 | De Sousa et al. | 210/232 |
| 4,639,318 | 11/1987 | Anderrson | 210/491 |
| 4,878,930 | 11/1989 | Manniso et al. | 210/493.2 |
| 4,894,270 | 1/1990 | Nicholls | 156/227 |
| 5,154,827 | 10/1992 | Ashelin et al. | 210/490 |
| 5,202,021 | 4/1993 | Griffin et al. | 210/232 |
| 5,202,023 | 4/1993 | Trimmer et al. | 210/321.89 |
| 5,211,846 | 5/1993 | Kott et al. | 210/232 |
| 5,252,207 | 10/1993 | Miller et al. | 210/335 |

FOREIGN PATENT DOCUMENTS

1306593  4/1987  U.S.S.R. ..................... 210/232

*Primary Examiner*—Virginia Manoharan
*Attorney, Agent, or Firm*—Jansson & Shupe, Ltd.

[57] ABSTRACT

A filter component having a substantially rigid support core and a filter element. The core includes a projecting first anchoring rib and the filter element (which is substantially flat in a repose position) has first and second spaced end panels. At least the first end panel of the element is attached to the anchoring rib when the element is mounted on the component. Element-component attachment is, in one aspect, by panel-mounted hook-like devices which attach to the rib. Attachment devices may also be embodied as clip mechanisms or rivet-like fasteners. A retaining tab on the component platform fits into a tab notch on the filter element when the element is mounted on the component.

17 Claims, 6 Drawing Sheets

FILTER APPARATUS

FIELD OF THE INVENTION

This invention relates generally to purification and, more particularly, to liquid purification by filtering.

BACKGROUND OF THE INVENTION

Filtering apparatus are used for a wide variety of purposes, most of which involve separating a substance, e.g., particulate matter, from a "medium" with which the substance is mixed. Certain types of such filtering apparatus are used to separate particulate matter from a flowing medium, e.g., air or water.

Examples of types of filtering apparatus used for water filtration are shown in U.S. Pat. Nos. 4,507,200 (Meissner); 3,988,244 (Brooks) and 5,190,651 (Spencer). Such apparatus, widely applied for filtering water in swimming pool and spa applications, incorporate a rigid outer enclosure or housing having connections for delivering water to and receiving water from such housing.

Confined within the housing is a filter cartridge of the type shown in the Spencer patent or the Brooks patent noted above. Such cartridge has a structural filter component embodied as a perforated, substantially rigid support core having a serpentine flow path along its length. A permeable filter element made of pleated cloth, paper or the like is mounted so that such element contacts the core. Because there is a pressure differential across the element (sometimes referred to as a "pressure drop") while liquid is flowing through it, there is a tendency for the element to deform or collapse. The core supports the element and prevents such deformation or collapse.

In the arrangements shown in the aforementioned Spencer and Brooks patents, the core is interposed between two concentric filtering elements. Top and bottom end caps are permanently attached to the elements and to the core to form a hollow, tube-like cartridge. It is not uncommon to encounter cartridges which are quite substantial in size, i.e., about nine inches in diameter and more than eighteen inches in length.

Water pumped into the housing flows radially outward through the inner element and radially inward through the outer element as it is filtered. The filtered water then flows downward along the serpentine path in the core and thence to an exit port in the housing. The leading manufacturer of such housings, filter cartridges and other water-filtration apparatus for pool and spa use is Sta-Rite Industries, Inc. of Milwaukee, Wis.

While such arrangements have been generally satisfactory for their intended purpose, they have certain characteristics which some users view as disadvantageous. For example, the bottom end cap of a filter cartridge of the type described above fits snugly into an annular slot or groove formed in a housing base and seals along the groove edges. Such sealing is needed to prevent water from "bypassing" the cartridge.

When the user desires to withdraw the cartridge from the base for cleaning or replacement, it is necessary to manually overcome this "frictional" snug fit. In a larger cartridge, this can require significant "lifting" force.

Yet another disadvantage is that when the cartridge is waterlogged, it is heavy—and in the case of a larger cartridge, it is very heavy. For that reason alone, it may be difficult for an infirm or slightly-built person to lift and remove the cartridge from the housing. And the aforementioned frictional fit aggravates that problem.

Still another disadvantage is that, at least as to the inner element in a dual-element cartridge, such inner element is difficult to clean. This is so since the hole through the axial center of the cartridge is not sufficiently large to admit a person's hand while holding a garden hose. Hosing a filter element is the technique commonly used to wash collected particulate matter from the element surfaces.

Another disadvantage is that because the end caps, the core and the elements are all bonded together, it is not possible to gain access to those element surfaces which are adjacent to the core. Therefore, particulates which may be lodged on such surfaces cannot be removed (at least not readily removed) by hosing. A corollary disadvantage is that an element cannot be easily "backwashed" by flowing pressurized water through it in reverse direction. The pool or spa pumping system is usually not arranged to permit "inside out" or reverse water flow and access for hosing purposes cannot be gained to those element surfaces adjacent to the core.

Another disadvantage is that because of their inherent shape, cylindrical filter cartridges waste significant amounts of storage and shipping space. If they are boxed (as they typically are), there are wasted spaces between the cartridge and the box corners and at the center cavity of the cartridge itself. If they are loose (much less typically), it is not possible to place multiple stacks of cylindrical filter cartridges without having unusable, relatively-large-area interstices between them.

Yet another disadvantage is that if one of the 10 filtering elements because damaged, e.g., torn or the like, it can no longer effectively filter water. In that event, the entire cartridge must be discarded and replaced. Doing so involves unnecessarily discarding the central core (which is rarely damaged) as well as discarding the end caps and intact filtering element.

An improved filter apparatus overcoming these disadvantages would be an important advance in the art.

OBJECTS OF THE INVENTION

It is an object of the invention to provide an improved filter apparatus overcoming some of the problems and shortcomings of the prior art.

Another object of the invention is to provide an improved filter apparatus having separately replaceable elements.

Another object of the invention is to provide an improved filter apparatus in which the elements are readily attached to and detached from the supporting component.

Yet another object of the invention is to provide an improved filter apparatus in which both sides of a filter element are very easy to clean.

Still another object of the invention is to provide an improved filter apparatus in which the filter elements may be shipped and stored flat for space-saving.

Another object of the invention is to provide an improved filter apparatus in which the filter elements are relatively light in weight, even when wet.

Another object of the invention is to provide an improved filter apparatus in which removal of a filter element involves little, if any, force exertion overcoming frictional fit.

Yet another object is to provide an improved filter apparatus in which the filtering elements are easily located on and fitted to the supporting component. How these and other objects are accomplished will become apparent from the following descriptions and from the drawing.

SUMMARY OF THE INVENTION

An aspect of the invention involves a improved filter element for mounting on a supporting filter component, e.g., a cage-like structure having a substantially rigid support core and a projecting rib for "anchoring" the element to the component. The component is usually mounted upright.

A preferred element is rectangular in shape and has spaced top and bottom sealing lips and spaced end sealing lips. When so arranged, the sealing lips define what may be called an element "frame" circumscribing the particulate-removing filter.

The element includes a liquid-permeable filter medium made of pleated paper or the like for removing particulate matter from a liquid. Each element end panel includes a device for attachment of that end panel to the anchoring rib. Whether the support core is cylindrical (as in the preferred embodiment) or of some other shape, the element is wrap-mounted on the core and, by the attachment device, is attached to the anchoring rib at either element end.

In one highly preferred arrangement, the attachment device is embodied as a hook for attaching the end to the rib. And there are yet other ways in which an element may be attached to the component. For example, the first end panel of the element may be attached to the anchoring rib by a clothespin-like compression clip mechanism. Such mechanism "clamps" over the end panel and the rib for secure element attachment.

Yet another way to attach the first end panel of the element to the anchoring rib is by a rivet-like fastener device. Such device extends through both the end panel and the rib and may be of the self-locking reusable type. Irrespective of the way in which an element is attached, it is preferred that the element-supporting platform have at least one retaining tab projecting from it. The filter element includes a sealing lip and, preferably, top and bottom resilient sealing lips. When the element is mounted, the bottom lip is between the tab and an upright edge of the platform. The platform and the tab thus help to properly position the element on the component and retain the element in sealing engagement with the component.

The element also has end sealing lips and all resilient lips, i.e., top, bottom and end lips, seal against the component when the element is mounted thereon. Element-component sealing is preferred to prevent fluid to be filtered from "bypassing" the element, thus defeating the particulate-removing purpose of the filter.

An advantage of the inventive element is that in a "repose" position prior to mounting on the component, the element is substantially flat. Thus, such element can be shipped and stored flat as a replacement product for the "aftermarket." When sold for that purpose, the element is surrounded by a package such as a plastic envelope or a cardboard carton.

Another aspect of the invention involves the combination of the filter component (with its core) and at least a first filter element. In the improvement, the core includes a projecting first anchoring rib. As mentioned above, the element has first and second spaced end panels and at least the first end panel of the element is attached to the anchoring rib when the element is mounted on the component.

More specifically, the rib projects away from the core has a rib edge. The first end panel of the filter element includes an attachment device which, in one version, is embodied as a hook. For very small elements and element-supporting filter components and/or for elements having an attachment device embodied as a long hook extending a substantial portion of the length of the rib, only one such device may be adequate to attach a filter element end panel to the rib. However, for larger elements and element-supporting filter components and/or for elements having an attachment device embodied as a short hook, it may be desirable to use two or more such devices to attach the filter element to the rib.

The filter element includes an upper edge or "boundary" and in the event two or more attachment devices are used, the device of the first end panel is spaced from the upper boundary by a first dimension. Similarly, the device of the second end panel is spaced from the upper boundary by a second dimension different from the first dimension so that rib-attaching interference between the devices, (whether by hooks, by fingers or by similar devices) is substantially avoided.

In a highly preferred arrangement, the combination includes a second filter element and the core also includes a projecting second anchoring rib. Like the first element, the second filter element is substantially flat in a repose position and has first and second spaced end panels. At least the first end panel of the second element is attached to the second anchoring rib when the second element is mounted on the core.

Preferably, each of the first and second end panels of the second element includes an attachment device. Such device may be embodied as a hook over the edge of the second anchoring rib.

Further details of the invention are set forth in the following detailed description and the drawing.

DETAILED DESCRIPTIONS OF PREFERRED EMBODIMENTS

Figure 1:
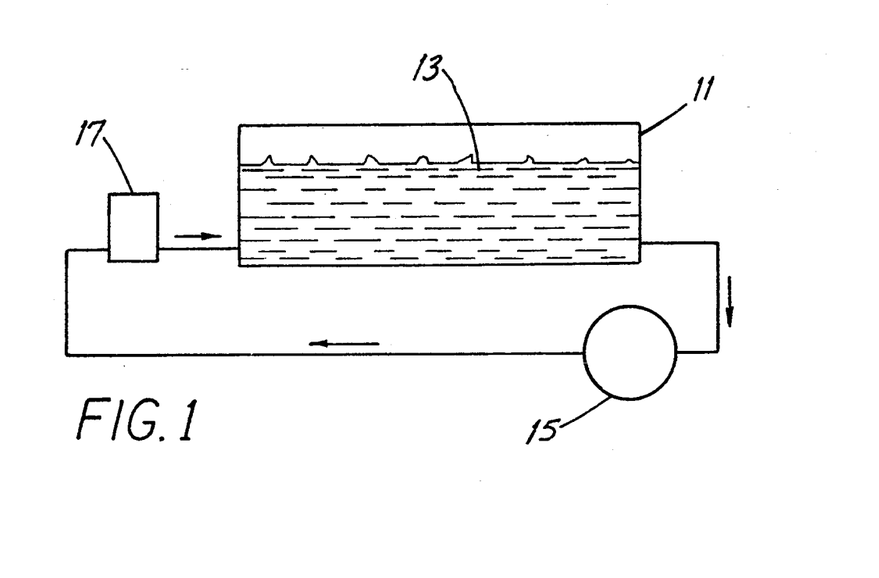
FIG. 1 is a representative schematic diagram of a pool or spa and a water filtering system used therewith.

Before describing the inventive filter apparatus 10, it will be helpful to have an understanding of the way in which such apparatus 10 is used. Referring to FIG. 1, a spa or pool 11 is filled with water 13 which periodically (or substantially continuously) is drawn from the pool 11 by a pump 15. The pump 15 delivers water under pressure to a housing 17 in which the apparatus 10 is confined. Such water flows through the apparatus 10 which removes water-borne particulates. The filtered water is then returned to the pool 11.

Figure 2:
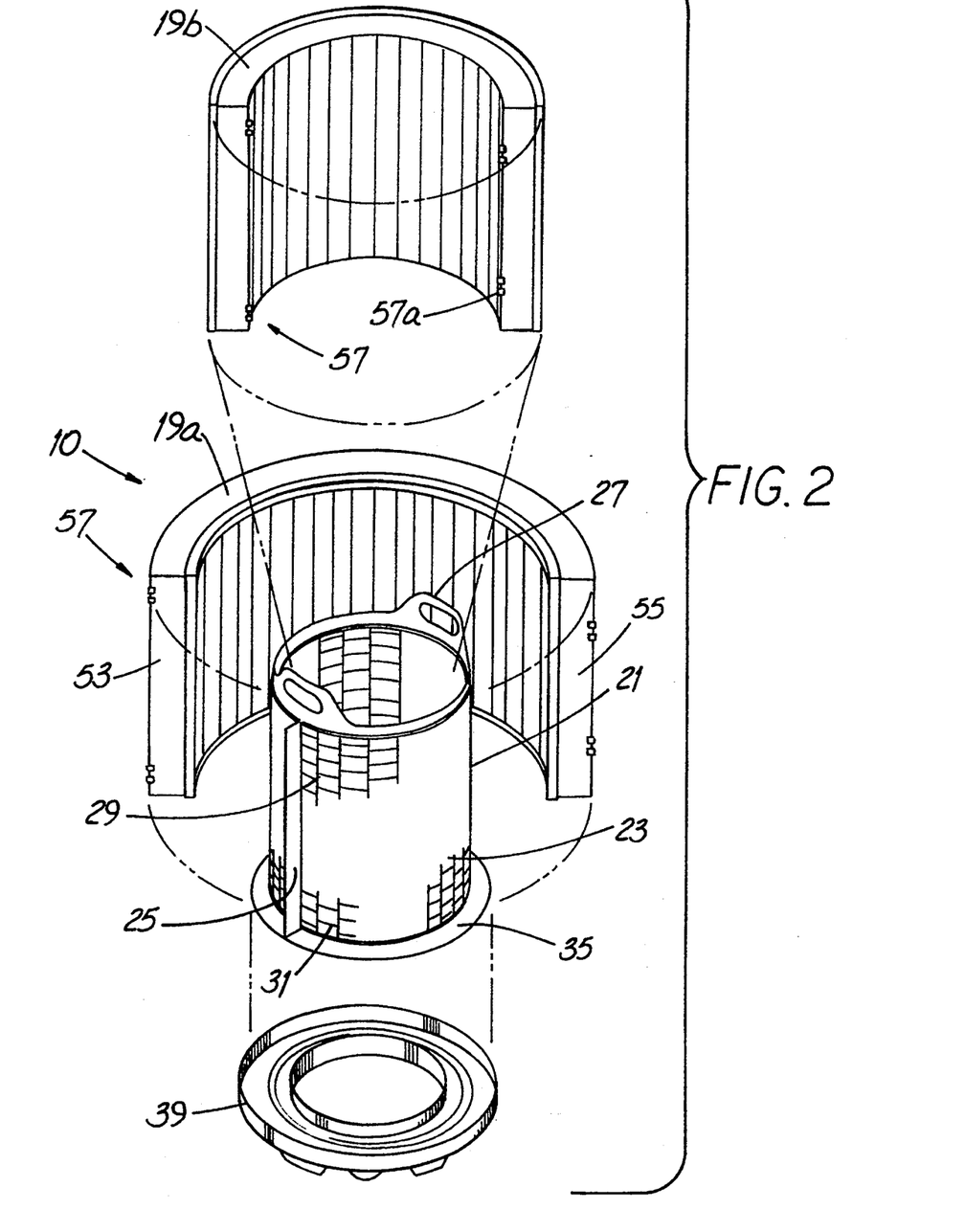
FIG. 2 is an exploded view of the inventive apparatus.
Figure 3:
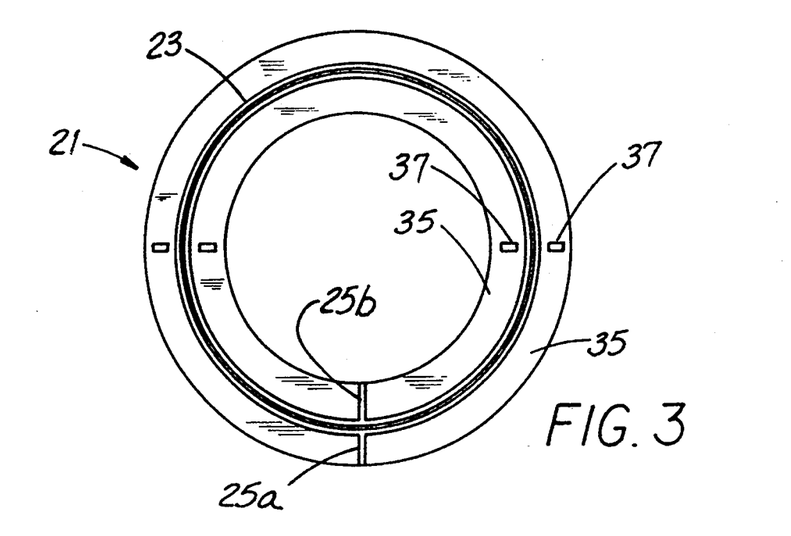
FIG. 3 is a top plan view of the element-supporting component shown in FIG. 2.

Referring additionally to FIGS. 2 and 3, the inventive aspects of the new filter apparatus 10 will now be described.

Such apparatus 10 includes an improved filter element 19a or 19b for mounting on (or mounted on) a supporting filter component 21. The component 21 is a hollow, cylindrical cage-like structure having a substantially rigid support core 23 and projecting ribs 25 for "anchoring" the element 19 to the component 21. For easier handling, lifting handles 27 are provided at the top rim of the core 23.

The core 23 has radially-spaced vertical bars 29 and vertically-spaced horizontal slats 31, the latter having a thickness (measured radially) less than the radial thickness of the bars 29. As been seen in FIG. 4A, such slats 31 are alternately located toward the outer and inner surfaces of the bars 29 so that a vertical serpentine path 33 is defined by each vertically-arranged "set" of slats 31 and the pair of bars 29 to which each slat 31 in the set is attached. As further described below, water or other filtered fluid flows down the serpentine paths 33 and out of the housing 17 through appropriate channels.

Figure 4A:
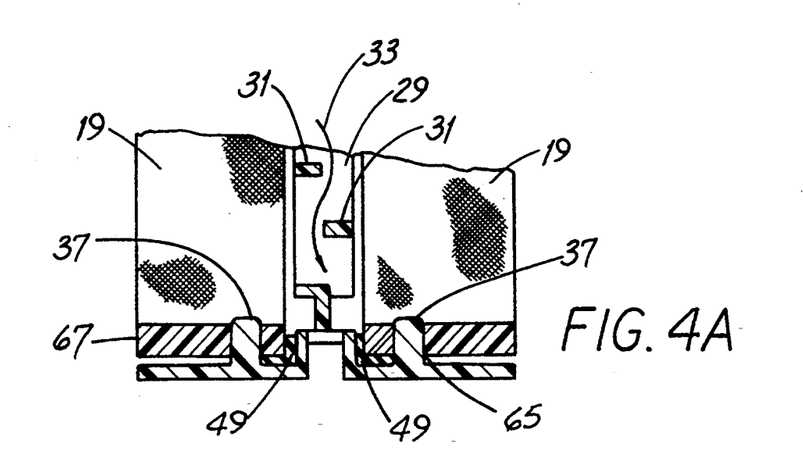
FIG. 4A is a cross-sectional elevation view, with parts broken away, showing a filter element mounted on the component and showing the retaining tab feature.
Figure 4B:
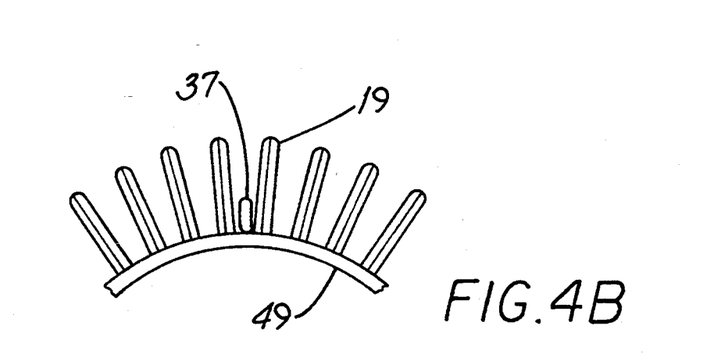
FIG. 4B is a bottom view, with parts broken away, showing the bottom surface of the element of FIG. 4A to illustrate how the tab retains a sealing lip against the component platform. The bottoms of the pleated filter medium are shown "pinched together" and sealed.

The component 21 also has an annular, ring-like element-supporting platform 35 attached to the lower end of the core 23. As best seen in FIG. 3, the platform 35 extends radially inward and outward about equal distances from the core 23. Referring additionally to FIGS. 4A and 4B, retaining tabs 37 extend away from the platform 35 (toward the viewer in FIG. 3) and the purpose of such tabs 37 is described below. The component 21 also has at least one and preferably first and second radially-projecting anchoring ribs 25a, 25b, respectively, attached to the core 23 and the platform 35 and used for attaching filter elements 19 to the component 21. As illustrated in FIG. 3, the rib 25a projects outward while the rib 25b projects inward. Such ribs 25 are located on the same radius merely as a matter of convenience. And as will become apparent from the following description, there may be additional ribs 25 or pairs of ribs 25.

Preferably, the component 21 is injection molded. Larger components 21 are preferably molded in two "half-cylinder" pieces and snapped together.

And the component 21 and the elements 19 are, in a preferred embodiment, nested into a molded flow collector 39 of the type shown in U.S. Pat. No. 5,190,651 (Spencer). The component 21 and flow collector 39, having no moving parts and not being particularly susceptible to breakage, are re-usable with replacement filter elements 19 as further described.

Figure 5:
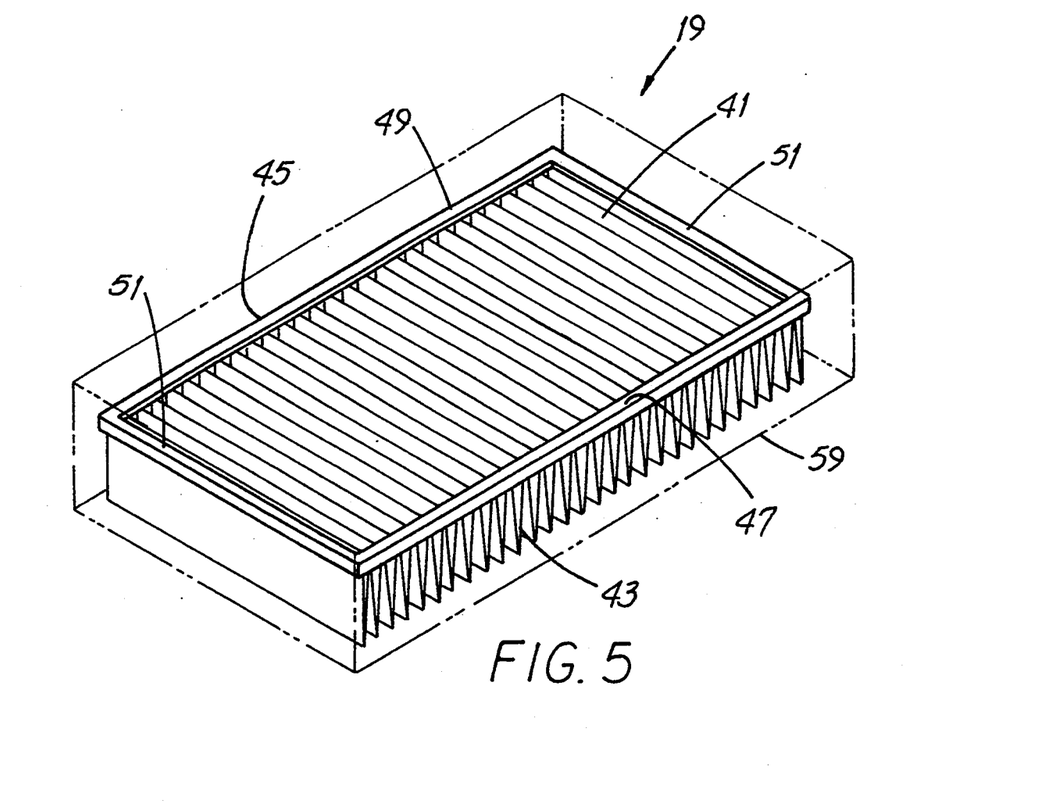
FIG. 5 is a perspective view of a filter element packaged as an aftermarket product.

Referring again to FIG. 1 and additionally to FIG. 5, inventive aspects of the improved filter element 19 will now be described. Such element 19 includes a filtering medium 41 such as pleated paper, cloth, plastic mesh or the like. The medium 41 is sealed along its top and bottom edges 43, 45, respectively, to prevent fluid from bypassing such medium 41. A preferred element 19 is rectangular in shape and has top and bottom sealing lips 47, 49, respectively, attached to the medium 41 and end sealing lips 51, also attached to the medium 41. When so arranged, the sealing lips 47, 49, 51 define what may be called an element "frame" circumscribing the particulate-removing medium 41 and sealing the element 19 against the component 21 to prevent fluid from bypassing around such element 19.

The element 19 also includes a pair of rigid, planar end panels 53, 55 affixed at the ends of the medium 41. Such end panels 53, 55 (along with attachment devices 57 used therewith) serve to attach an element 19 to an anchoring rib 25 when the element 19 is "wrap-mounted" on the core 23. However, when the element 19 is supplied as an "aftermarket" replacement product, such element 19 is substantially flat in a repose position as shown in FIG. 5 and is surrounded by a package 59, e.g., a box, plastic envelope or the like, as represented by the dashed outline around the element 19.

Figure 6:
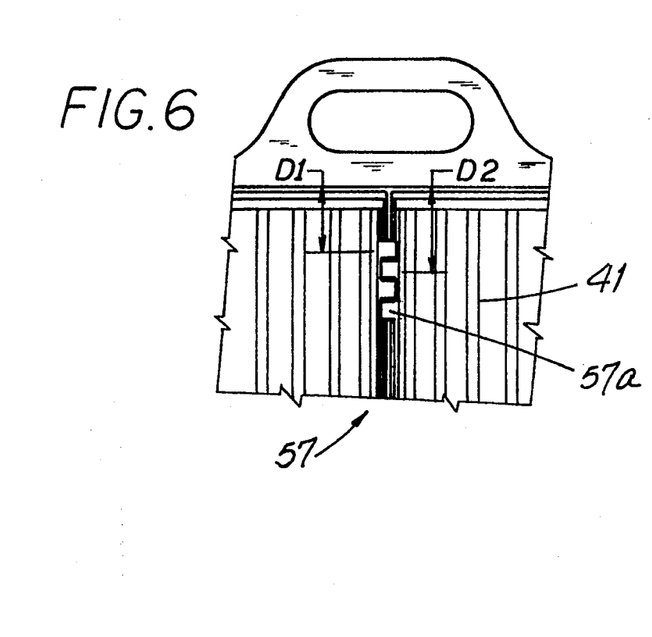
FIGS. 6 and 7 are elevation and perspective views, respectively, with parts broken away, showing an element-component attachment device embodied as a hook.
Figure 7:
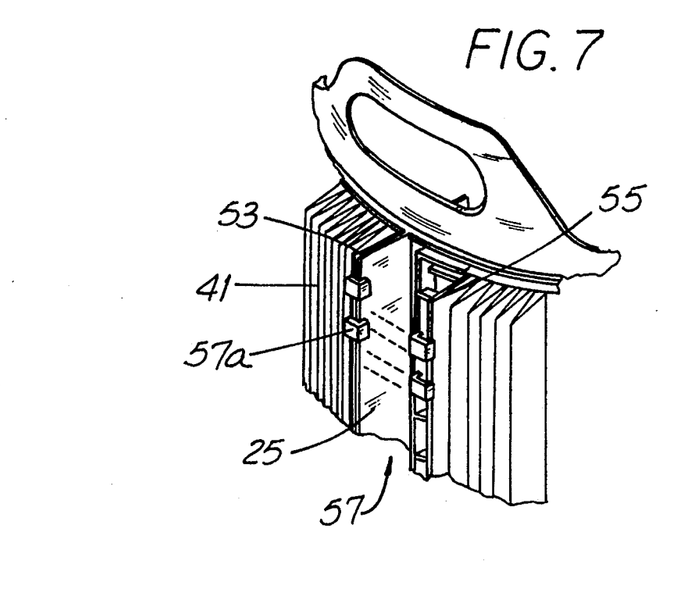

Several novel attachment devices 57 useful to attach the element 19 to the component 21 will now be described. Referring to FIGS. 2, 6 and 7, in one highly preferred arrangement, the attachment device 57 is embodied as a hook 57a for attaching an end panel 53, 55 to the anchoring rib 25. Each hook 57a engages the outer edge of the rib 25. In the exemplary arrangement of FIGS. 2, 6 and 7, there are two pairs of hooks 57a, one each near the top and bottom of each end panel 53, 55. However, each end panel 53, 55 could have but one hook 57a, or more than one hook 57a in a variety of spacings without departing from the invention.

Referring particularly to FIGS. 6 and 7, the hook 57a on the first end panel 53 is spaced from the upper boundary of the element 19 by a first dimension "D1" and the hook 57a on the second end panel 55 is spaced from such upper boundary by a second dimension "D2" which is different from the first dimension. The resulting "staggered" hook spacing avoids rib-attaching interference when the element 19 is completely attached to the rib 25. Of course, after appreciating the foregoing, it will be apparent how any type of attachment device 57 may be arranged to avoid rib-attaching interference.

Figure 8:
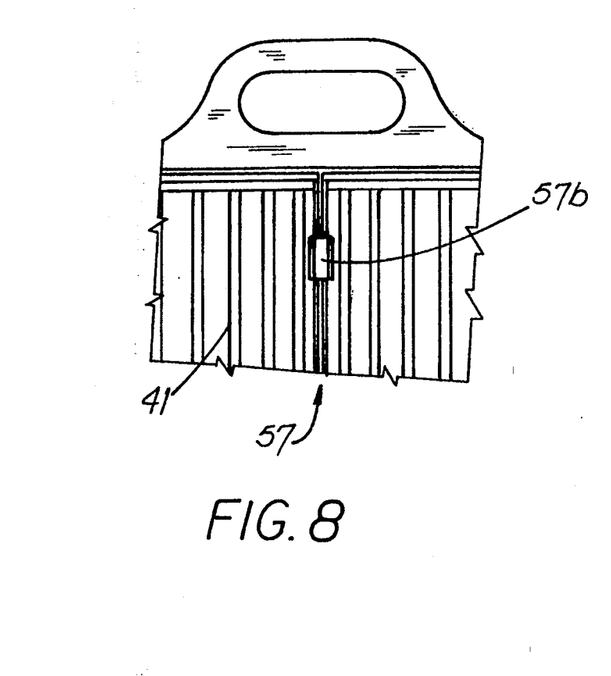
FIGS. 8 and 9 are elevation and perspective views, respectively, with parts broken away, showing an element-component attachment device embodied as a compression clip mechanism.
Figure 9:
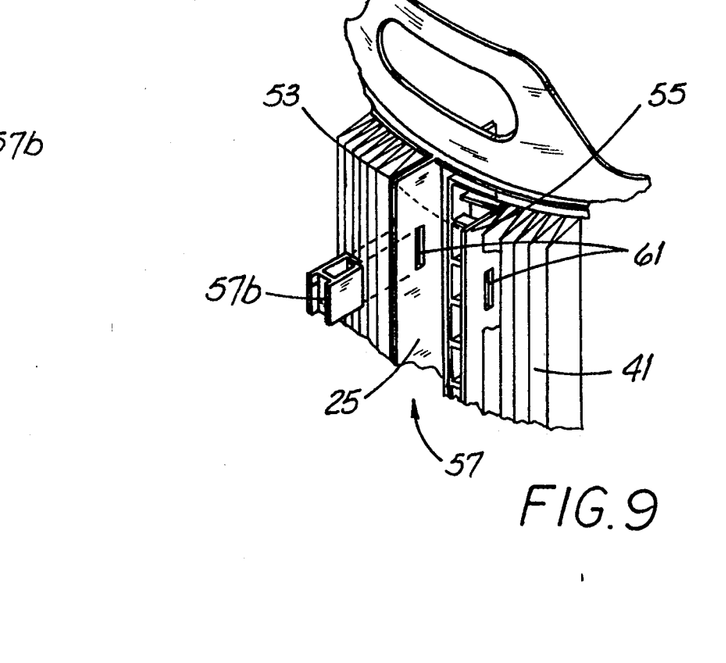

And there are yet other ways in which an element 19 may be attached to the component 21. Referring to FIGS. 8 and 9, the attachment device 57 may be embodied as a clothespin-like compression clip mechanism 57b. Such mechanism 57b "clamps" over the end panels 53, 55 and the anchoring rib 25 and has jaws extending through apertures 61 formed in such panels 53, 55 and rib 25. Thus, the mechanism 57b holds the end panels 53, 55 in compression contact with the rib 25.

Figure 10:
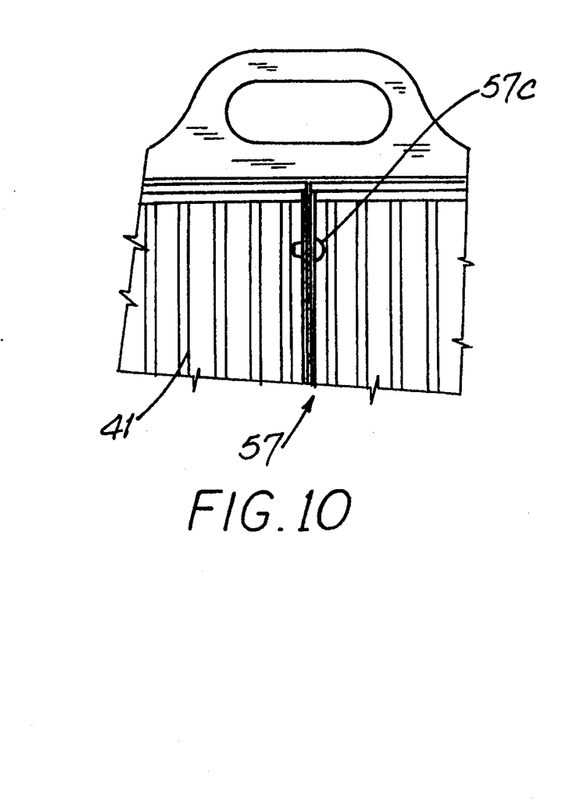
FIGS. 10 and 11 are elevation and perspective views, respectively, with parts broken away, showing an element-component attachment device embodied as a rivet-like fastening device.
Figure 11:
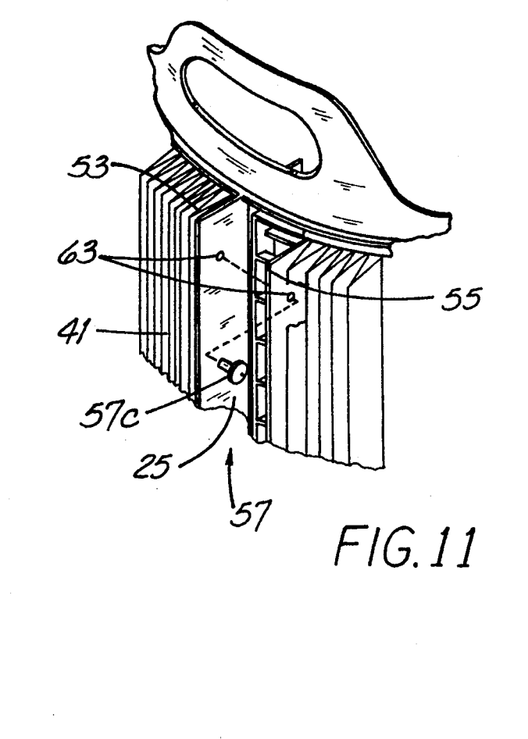

Referring now to FIGS. 10 and 11, yet another way to attach an element 19 to the component 21 involves a rivet-like fastener device 57c. Such device 57c extends through apertures 63 in both of the end panels 53, 55 and in the rib 25 and may be of the self-locking reusable type.

As described above, a preferred component 21 includes a retaining tab 37 which bears against the sealing lip 49 and retains such lip 49 against an upstanding edge of the platform 35 when an element 19 is mounted on the component 21. This helps assure that fluid is forced to flow through the filtering medium 41 and cannot bypass around such medium 41.

Referring again to FIGS. 4A, 4B and 5, it is to be appreciated that the view of FIG. 5 shows the raw ends of the accordion-like pleated filter medium 41. In practice, such ends are sealed with plastic material 67 as shown in FIGS. 4A and 4B.

While only a few exemplary preferred embodiments of the inventive apparatus 10 have been described, it is apparent from the foregoing that a number of variations are possible without departing from the spirit of the invention. For example, the core 23 can be used with only one element 19 to permit flow "outside in" or "inside out" only.

And although there are several advantages to using two elements 19, both of which "wrap-mount" on the component, wrap-mounting of only one element 19 could be used. And means such as wires, straps or the like could be used in place of hooks 57a, clamping mechanisms 57b or rivets 57c to attach the element 19 to the component 21. There are also advantages to using cylindrical element-mounting components 21 but components 21 having other geometrical shapes are possible.

I claim:

1. In combination, (a) a filter component having a tubular, substantially rigid support core and (b) at least a first filter element, the improvement wherein:
    the core includes a radially projecting first anchoring rib having an edge radially spaced from the core;
    the element has an end panel parallel to the anchoring rib; and,
    the end panel includes an attachment device engaging the edge, the end panel thereby being attached to the anchoring rib when the filter element is mounted on the component by wrapping it once about the core; and
    the first filter element is configured to lie flat when in a repose position detached from the core.

2. The combination of claim 1 further including a second filter element and wherein:
    the first anchoring rib projects in a first direction;
    the core also includes a second anchoring rib projecting radially in a second direction;
    the second filter element is substantially flat in a repose position;
    the second filter element has first and second spaced end panels; and,
    the end panels of the second filter element are attached to the second anchoring rib when the second element is mounted on the core.

3. The combination of claim 2 wherein:
    the second anchoring rib has an edge; and,
    the first and second end panels of the second filter element each include a hook over the edge of the second anchoring rib.

4. The combination of claim 2 wherein:
    the first and second end panels of the second element are attached to the second anchoring rib by a clip mechanism.

5. The combination of claim 2 wherein:
    the first and second end panels of the second element are attached to the second anchoring rib by a piercing fastener.

6. The combination of claim 1 wherein:
    the filter component includes an element-supporting platform projecting radially away from the core;
    the platform has at least one retaining tab projecting therefrom;
    the filter element includes a sealing lip; and,
    the sealing lip is between the tab and the core when the filter element is mounted on the component.

7. The combination of claim 6 wherein the attachment device is a hook over the edge, thereby attaching the first end panel to the rib.

8. The combination of claim 6 wherein the attachment is a clip mechanism attaching the first end panel to the rib.

9. The combination of claim 6 wherein the attachment device is a piercing fastener attaching the first end panel to the rib.

10. In combination, (a) a filter component having a tubular substantially rigid support core and (b) at least a first filter element, the improvement wherein:
    the core includes a first anchoring rib projecting radially in a first direction and a second anchoring rib projecting radially in a second direction;
    the first filter element has a first end panel parallel to the first anchoring rib; and,
    the first end panel is attached to the first anchoring rib when the first filter element is mounted on the component by wrapping it on the core;
and wherein:
    the combination includes a second filter element which is substantially flat in a repose position and which has first and second spaced end panels; and,
    the end panels of the second filter element are attached to the second anchoring rib when the second filter element is mounted on the core.

11. The combination of claim 10 wherein:
    the first anchoring rib has an edge radially spaced from the core; and,
    the first end panel includes a hook engaging the edge, thereby attaching the first end panel to the first anchoring rib.

12. The combination of claim 11 wherein the first filter element has a second end panel spaced from the first end panel of the first filter element and the second end panel of the first filter element includes a hook engaging the edge, thereby attaching the second end panel of the first filter element to the rib.

13. The combination of claim 12 wherein:
    the first filter element includes an upper boundary;
    the hook of the first end panel of the first filter element is spaced from the upper boundary by a first dimension;
    the hook of the second end panel of the first filter element is spaced from the upper boundary by a second dimension different from the first dimension,
whereby rib-attaching interference between the hooks is substantially avoided.

14. The combination of claim 10 further including:
    a clip mechanism attaching the first end panel of the first filter element to the first anchoring rib.

15. The combination of claim 14 wherein the first filter element has a second end panel spaced from the first end panel of the first filter element and attached to the first anchoring rib by the clip mechanism.

16. The combination of claim 10 further including:
    a piercing fastener attaching the first end panel of the first filter element to the first anchoring rib.

17. The combination of claim 16 wherein the first filter element has a second end panel spaced from the first end panel of the first filter element and attached to the first anchoring rib by the fastener.

* * * * *